(12) United States Patent
Lavoie

(10) Patent No.: US 10,179,590 B2
(45) Date of Patent: Jan. 15, 2019

(54) PARK OUT ASSIST

(71) Applicant: Ford Global Technologies, LLC, Dearborn, MI (US)

(72) Inventor: Erick Michael Lavoie, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 72 days.

(21) Appl. No.: 14/849,625

(22) Filed: Sep. 10, 2015

(65) Prior Publication Data

US 2017/0072947 A1    Mar. 16, 2017

(51) Int. Cl.
*B60W 50/08* (2012.01)
*B62D 15/02* (2006.01)
*B60W 10/04* (2006.01)
*B60W 10/20* (2006.01)
*B60W 30/09* (2012.01)
*B60W 30/18* (2012.01)
*B60W 50/14* (2012.01)

(52) U.S. Cl.
CPC .......... *B60W 50/087* (2013.01); *B60W 10/04* (2013.01); *B60W 10/20* (2013.01); *B60W 30/09* (2013.01); *B60W 30/18027* (2013.01); *B62D 15/0265* (2013.01); *B62D 15/0285* (2013.01); *B60W 2050/146* (2013.01); *B60W 2550/10* (2013.01); *B60W 2710/0677* (2013.01); *B60W 2710/207* (2013.01)

(58) Field of Classification Search
CPC ............. B60W 30/06; B60W 2250/10; B60W 2710/18; B60W 2710/20
See application file for complete search history.

(56) References Cited

U.S. PATENT DOCUMENTS

| | | | |
|---|---|---|---|
| 6,882,915 B2 * | 4/2005 | Yamamura | G08G 1/167 701/301 |
| 8,903,608 B2 | 12/2014 | Niemz et al. | |
| 2002/0105423 A1 * | 8/2002 | Rast | G08G 1/162 340/479 |
| 2006/0162987 A1 * | 7/2006 | Hagl | B62D 5/0418 180/411 |

(Continued)

FOREIGN PATENT DOCUMENTS

| | | |
|---|---|---|
| DE | 19933732 A1 | 1/2001 |
| DE | 102008025219 A1 | 12/2009 |

(Continued)

OTHER PUBLICATIONS

UK Search Report 15931P/GB; Appl No. GB1615287.8; dated Mar. 1, 2017; 4 pages.

*Primary Examiner* — Behrang Badii
*Assistant Examiner* — Daniel L Greene
(74) *Attorney, Agent, or Firm* — Frank A. MacKenzie; Bejin Bieneman PLC

(57) ABSTRACT

A method, including: detecting a distance between a vehicle and an object. The method also includes determining, based on the distance between the vehicle and the object, that a path of travel of the vehicle presents a risk of collision between the vehicle and the object. The method also includes causing at least one of a wheel angle, a vehicle drivetrain, and vehicle braking to be changed to reduce the risk of collision.

20 Claims, 12 Drawing Sheets

(56) References Cited

U.S. PATENT DOCUMENTS

| | | | |
|---|---|---|---|
| 2008/0084286 A1* | 4/2008 | Teramura | B60Q 1/085 340/438 |
| 2009/0143951 A1* | 6/2009 | Takahashi | B60W 30/02 701/70 |
| 2010/0209881 A1* | 8/2010 | Lin | G09B 19/167 434/65 |
| 2010/0209883 A1* | 8/2010 | Chin | G09B 19/167 434/65 |
| 2010/0329510 A1 | 12/2010 | Schmid | |
| 2012/0265416 A1 | 10/2012 | Lu et al. | |
| 2013/0184925 A1 | 7/2013 | Niemz et al. | |
| 2014/0121930 A1 | 5/2014 | Allexi et al. | |
| 2014/0200769 A1 | 7/2014 | Noh | |
| 2015/0073664 A1* | 3/2015 | Petridis | G08G 1/16 701/41 |
| 2015/0077563 A1 | 3/2015 | Niemz | |

FOREIGN PATENT DOCUMENTS

| | | | |
|---|---|---|---|
| DE | 102009046163 A1 | 5/2011 | |
| EP | 2766244 A1 | 8/2014 | |
| WO | 2011029692 A1 | 3/2011 | |

\* cited by examiner

PARK OUT ASSIST

BACKGROUND

Automatic parking systems can maneuver a vehicle from a traffic lane into a parking spot, e.g., to perform parallel, perpendicular or angle parking. An automatic parking system aims to enhance driver comfort and safety in constrained environments where much attention and experience is required to steer the vehicle. The parking maneuver is typically achieved by coordinated control of the steering angle and speed, taking into account the vehicle's environment to achieve collision-free motion within the available space. For example, when parallel parking, a vehicle's automatic parking system can use ultrasonic sensors and cameras to locate a suitable parking space. The automatic parking system might operate the steering wheel of a vehicle, while a driver controls the acceleration, braking and shifting.

When departing a parallel parking space and merging into to traffic, a vehicle requires clearance, i.e., enough space to clear any obstacles or vehicles in front of the exiting vehicle and to safely merge into traffic in a single forward move. Unfortunately, present mechanisms for determining clearance for exiting a parking space are lacking.

DETAILED DESCRIPTION

Figure 1:
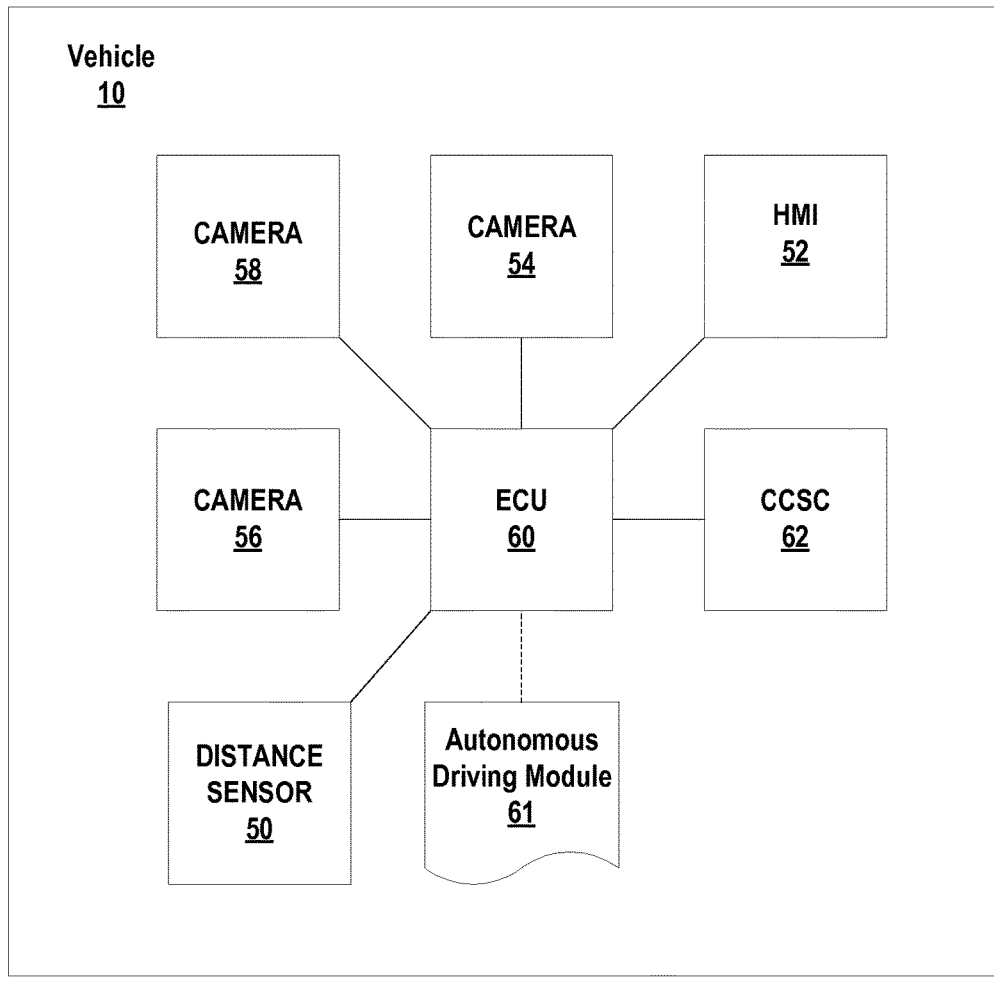
FIG. 1 illustrates a block diagram of an example vehicle with surround-view cameras linked to a human machine interface (HMI) and a chassis control system (CCS) computer.

With reference to the Figures, wherein like numerals indicate like parts throughout the several views, FIG. 1 illustrates a vehicle parking assistance system 50. A vehicle 10, which can be an autonomous vehicle or a semiautonomous vehicle, includes one or more cameras 54, 56, 58, providing images of an environment around the vehicle 10 to a human machine interface (HMI) 52 display. The HMI 52 is one or more devices such as are known (e.g., a display, a speaker, a microphone, a touch screen, a keyboard, etc.) to allow for interactions between drivers and the vehicle 10. The HMI 52 is communicatively coupled to an Electronic Control Unit (ECU) 60. The ECU 60 is communicatively coupled to a chassis control system computer (CCSC) 62 and one or more distance sensor 50. The ECU 60 and CCSC 62 each contain a processor to execute instructions from a memory. The memory also stores program parameters, variables, settings, etc.

The ECU 60 generally includes an autonomous driving module 61 that comprises instructions for autonomously and/or semi-autonomously, i.e., wholly or partially without operator input, operating the vehicle 10. The ECU 60 may be configured to account for collected images from the cameras 54, 56, 58 relating to a position of the vehicle 10 when the vehicle 10 is maneuvering by controlling the vehicle 10, e.g., in determining an actual speed, path, an actual acceleration, deceleration, etc. The ECU 60 receives data from various sensor placed about the vehicle 10, which can include a plurality of external object sensors (not shown) to detect a location of external objects, such as other vehicles, around the vicinity of the vehicle 10 itself and an acceleration pedal sensor (not shown), and a brake pedal sensor (not shown). Further, the ECU 60, e.g., in the module 61, generally includes instructions for communicating data, e.g., between the ECU 60 and the HMI 52, the CCSC 62, and the distance sensor 50.

The CCSC 62 monitors and/or controls the vehicle 10 suspension, steering and brakes for everyday driving tasks. The CCSC 62 collects information from wheel sensors (about suspension extension), steering sensors and acceleration sensors to calculate an optimized stiffness of the vehicle 10 ride. For example, the CCSC 62 works in the background and continuously monitors steering and vehicle direction. It compares the driver's intended direction (determined through the measured steering wheel angle) to the vehicle's actual direction (determined through measured lateral acceleration, vehicle rotation (yaw), and individual road wheel speeds).

Cameras in the present example include a front grill camera 54, a license plate camera 56, and two side view cameras 58. The ECU 60 combines images from the front grill camera 54, the license plate camera 56, and/or the side cameras 58 through image-stitching techniques or the like to produce a bird's-eye view of the vehicle 10. The ECU 60 can then provide a moving image on the vehicle 10 HMI 52 display, such images additionally or alternatively including a vehicle 10 environment, e.g., surroundings such as parking lot lane markings, curbs, and adjacent cars, etc. Image stitching is a known technique of combining multiple images with overlapping fields of view to produce a segmented panorama and/or a high-resolution image.

Figure 2A:
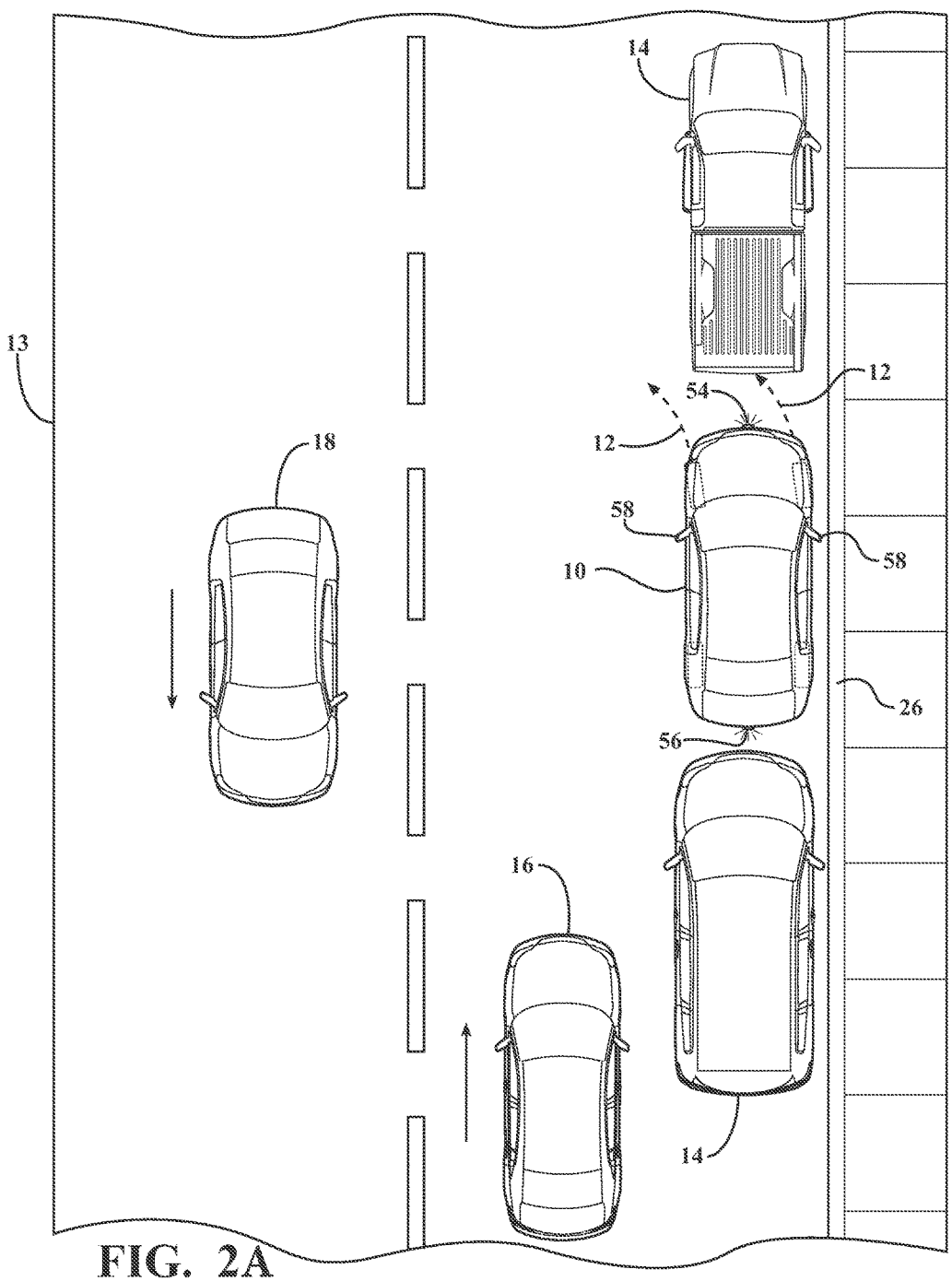
FIGS. 2A and 2B illustrate an overhead view of the vehicle of FIG. 1 about to exit a parallel parking spot between two parked vehicles and the vehicle's predicted path.

FIG. 2A illustrates an overhead view of the vehicle 10 about to exit a parallel parking spot between two parked vehicles 14 on a roadway 13 with a curb 26. A travelling vehicle 16 is travelling in a same direction as an intended direction of travel on the roadway of the vehicle 10. An oncoming vehicle 18 is traveling in an opposite direction. The vehicle 10 future path of travel 12 is uncertain, i.e., there is a possibility that the vehicle 10 may not be able to clear the vehicle 14 in front of the vehicle 10 when exiting the parallel parking spot in a single forward maneuver.

Determining a Distance

Known techniques may be used to obtain a measurement of distance between the vehicle 10 and the parked vehicle 14, e.g., using the front camera 54. For example, a plenoptic lens camera technique, such is known, which employs a single camera with multiple lenses with differing depth of fields, can determine the distance between the vehicle 10 and the parked vehicle 14. Another known technique includes measuring of planar objects with a calibrated camera technique which captures an image of a known standard size, such as a vehicle license plate positioned on the parked vehicle 14, and compares the image to the license plate's known dimension. Geometric calculations such as are known can be used to determine the distance between the front camera 54 and the vehicle 14 license plate. Other known camera distance measuring techniques that can be used include a stereo camera distance measuring technique and a depth of field—focal length technique, just to list a few.

In addition, the vehicle 10 can have distance sensor 50 for collision avoidance systems which also can measure distance. For example, sensor 50 can include one or more of an ultrasound distance measuring device, a LIDAR distance measuring device, a laser distance finder, or a radar sensor array distance measuring device, just to list a few of the sensor 50 the vehicle 10 can use to determine the distance between itself and an object, such as the parked vehicle 14.

Figure 2B:
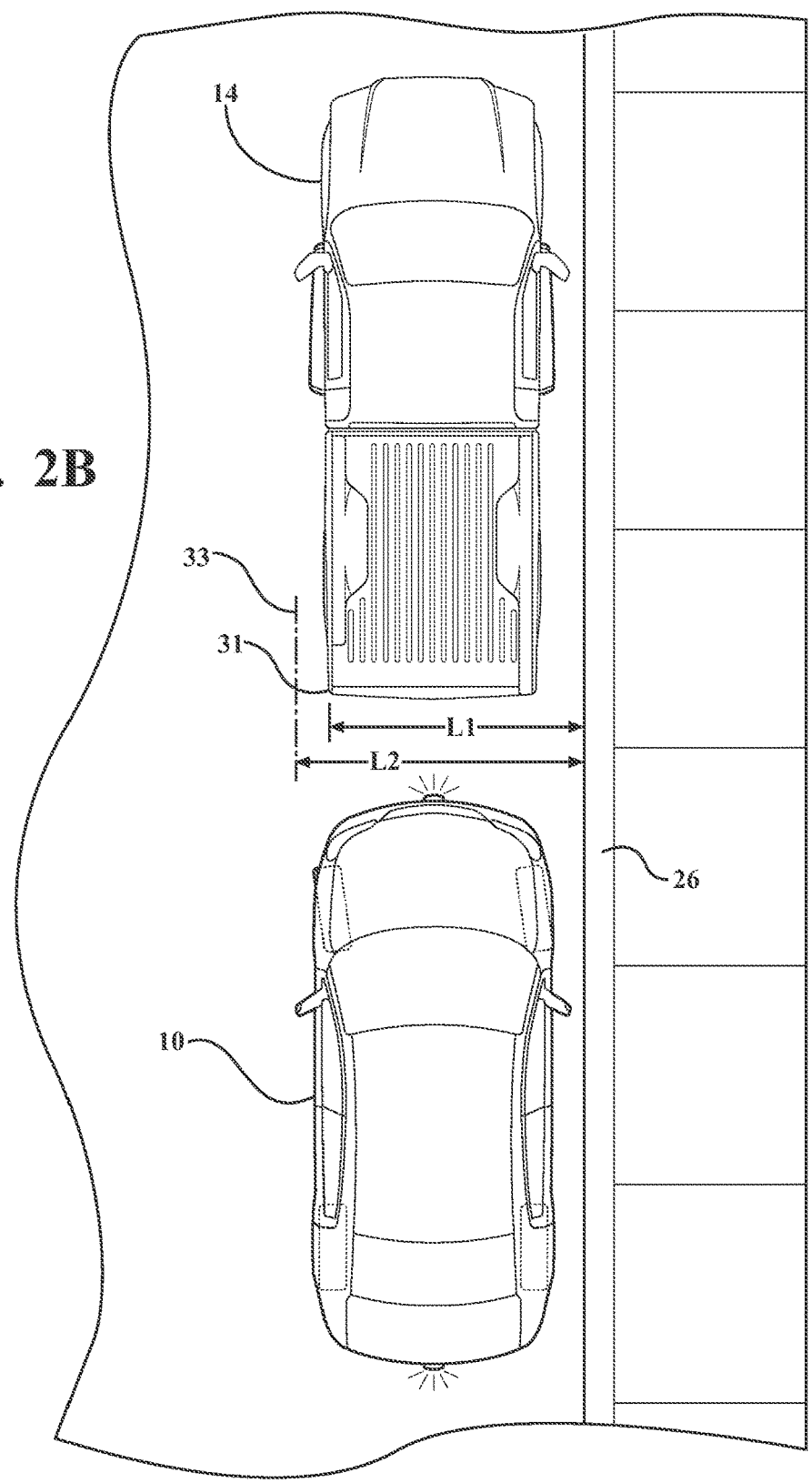

In addition to the distance between the vehicle 10 and the parked vehicle, a lateral distance L1 or a regional lateral distance L2, as illustrated in FIG. 2B, must be taken into consideration when egressing from the parking spot. The lateral distance L1 is a distance from the curb 26 to a left rear corner 31 position of the parked vehicle 14. The regional lateral distance L2 is a distance from the curb 26 to a standard outer perimeter 33 distance of the parking spot and can vary from region to region. For example, in the United States of America the standard outer perimeter 33 average lateral distance L2 is 2.5 meters, while in Europe, the average lateral distance L2 is 2.2 meters.

Path of the Vehicle

Figure 3A:
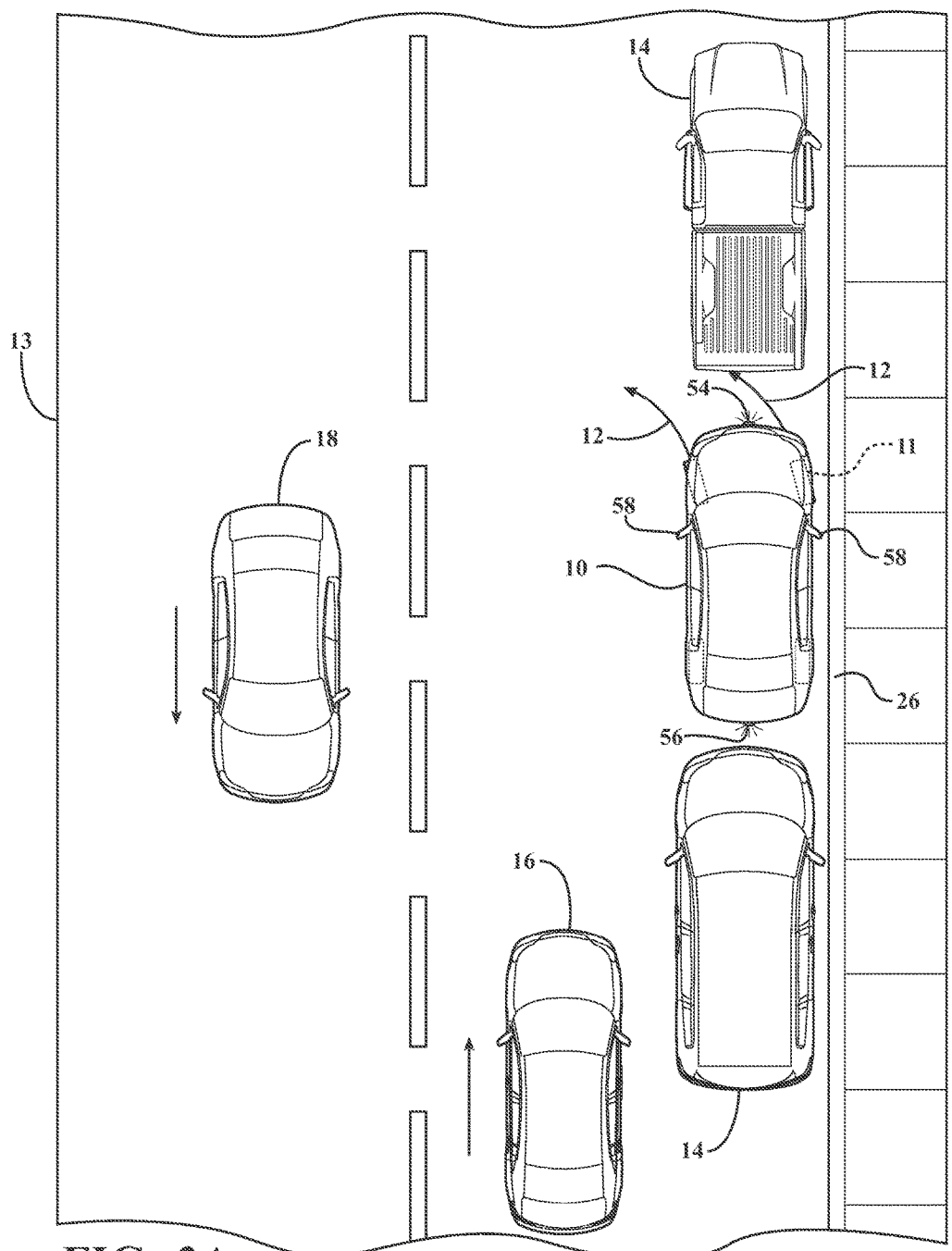
FIGS. 3A and 3B illustrate another overhead view of the vehicle of FIG. 1 about to exit a parallel parking spot between two parked vehicles and the vehicle's predicted path.
Figure 3B:
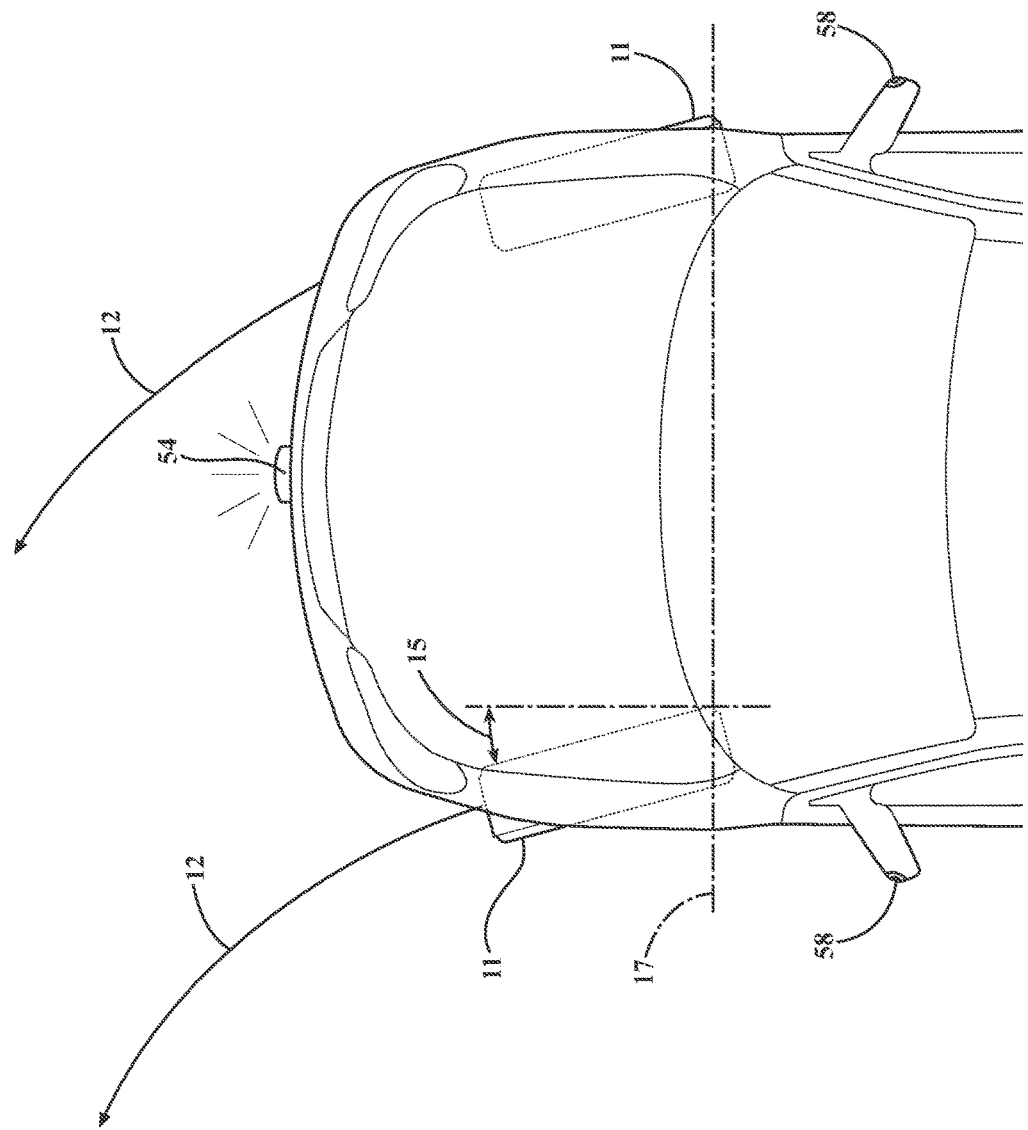

FIGS. 3A and 3B illustrate an example of a first parallel parking egress scenario showing the predicted path of travel 12 of the vehicle 10 when a wheel angle 15 of the wheel 11 will not allow the vehicle 10 to exit the parking spot in a single forward maneuver. In this first parallel parking egress scenario, it is apparent that the vehicle 10 predicted path of travel 12 will cause the vehicle 10 to collide with the parked vehicle 14. The predicted path of travel 12 is determined by the vehicle 10 ECU 60 using the wheel angle 15, vehicle 10 dimensions (typically stored in a memory of the ECU 60), a distance between the vehicle 10 and the parked vehicle 14, and either the L1 or L2 lateral distance, this distance being determined, e.g., as described above. For example, when the above distance measuring techniques determine the distance between the vehicle 10 and the parked vehicle 14 and can accurately determine the left rear corner 31 position of the parked vehicle 14, the ECU 60 will use the lateral distance L1 in the path calculations. If the distance measuring techniques cannot accurately determine the left rear corner 31, the ECU 60 will use the regional lateral distance L2. A measurement of the wheel angle 15 by the CCSC 62 is sent to the ECU 60. The wheel angle 15 is a measurement of the angle of the wheel 11 relative to a longitudinal axis 17 of the vehicle 10, such measurement typically being available on a vehicle 10 Controller Area Network (CAN) bus or the like, as is known.

Figure 4A:
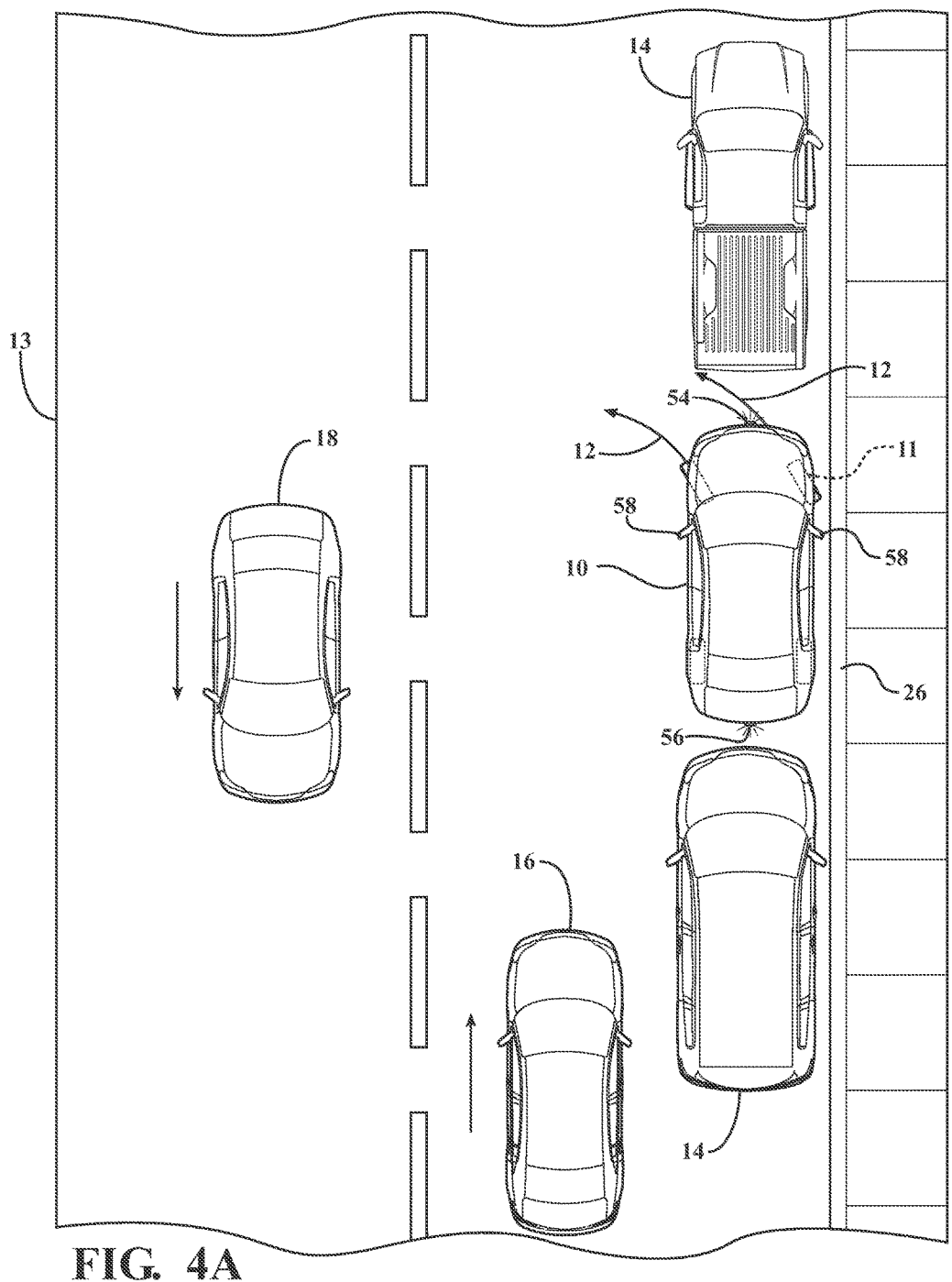
FIGS. 4A and 4B illustrate another overhead view of the vehicle of FIG. 1 about to exit a parallel parking spot between two parked vehicles and the vehicle's predicted path.
Figure 4B:
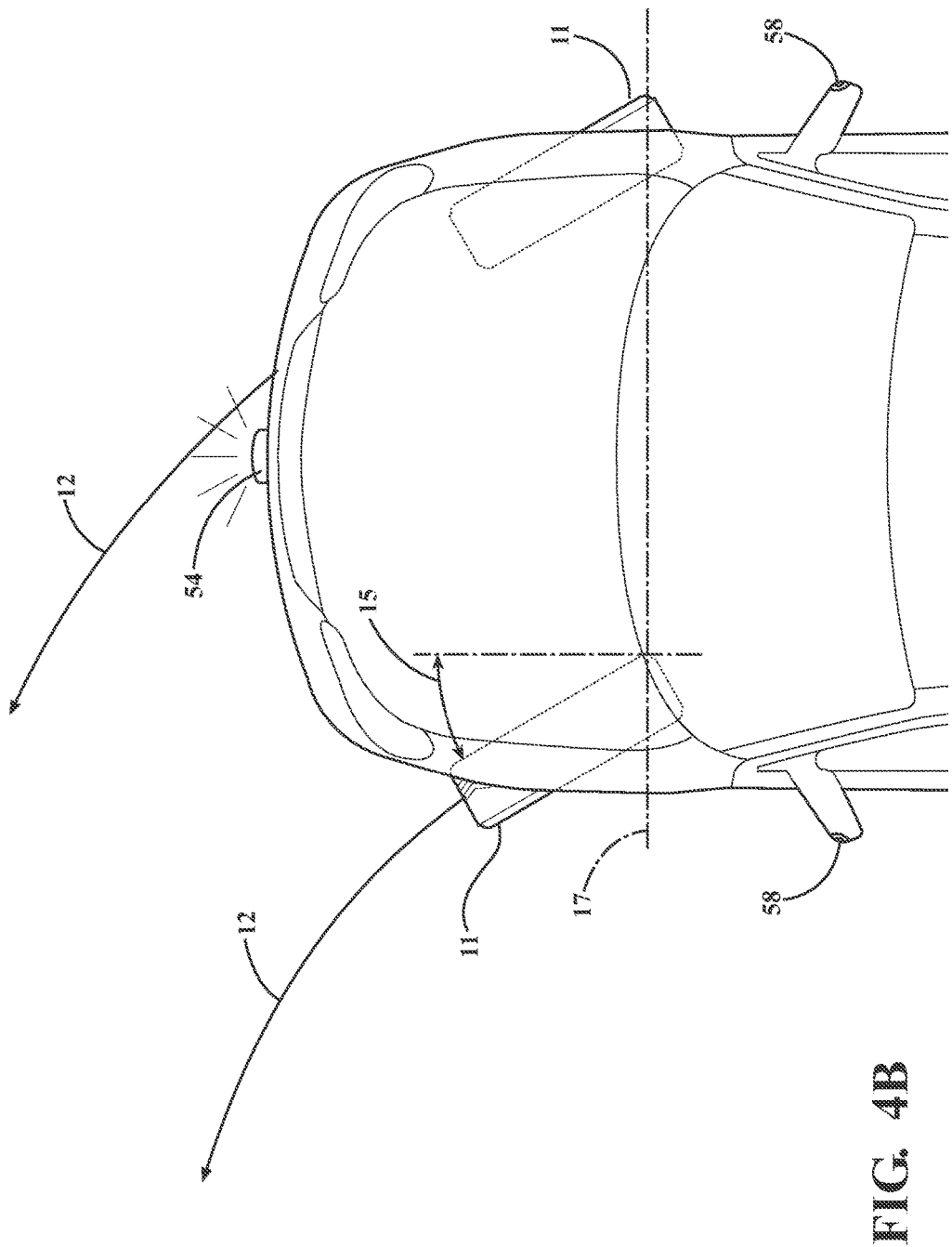

FIGS. 4A and 4B illustrate an example of a second parallel parking egress scenario showing the predicted path of travel 12 of the vehicle 10 with an increase of the wheel 11 wheel angle 15. A successful egress of the vehicle 10 from the parallel parking spot is not clearly possible, but may be possible, in this illustration.

Figure 5A:
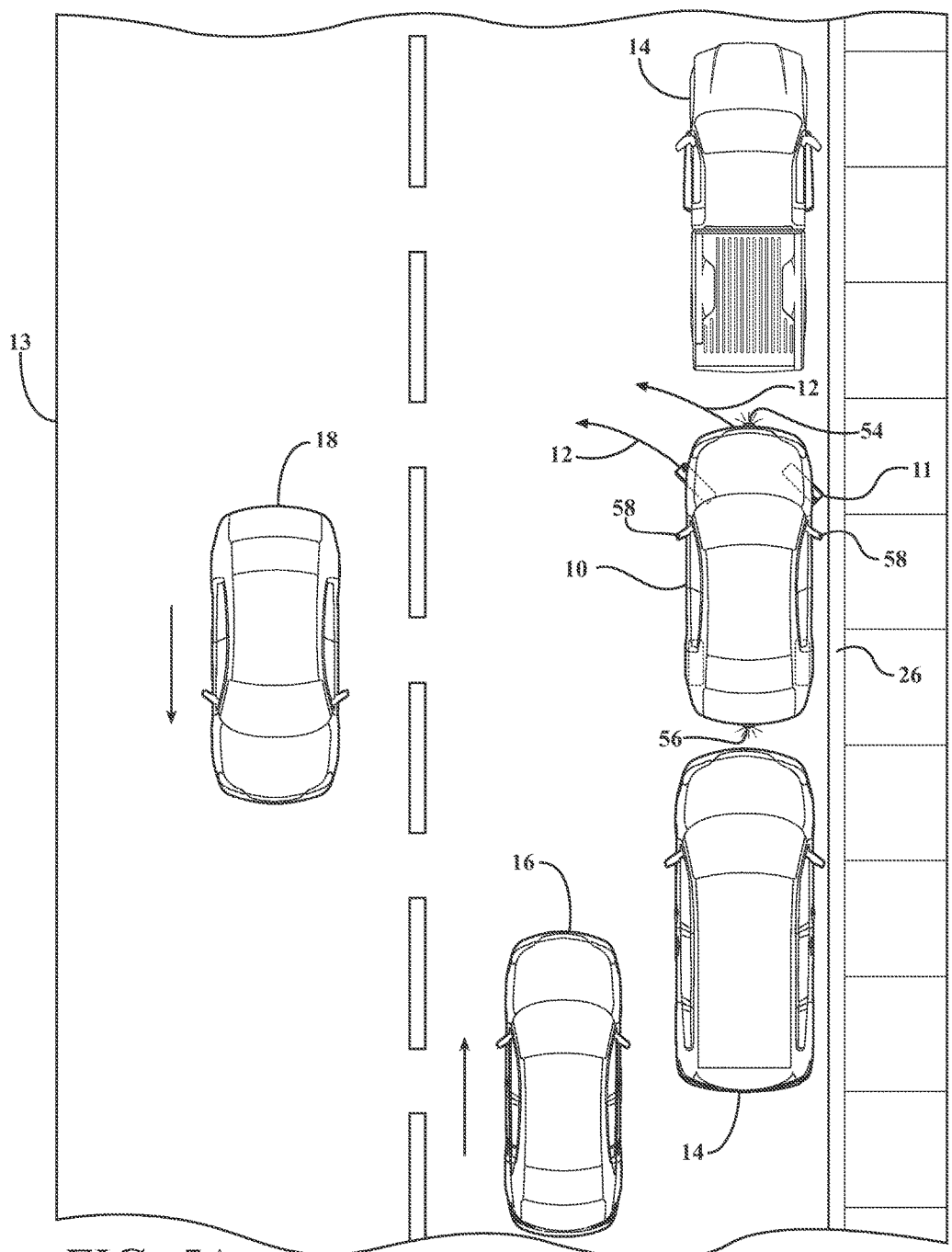
FIGS. 5A and 5B illustrate another overhead view of the vehicle of FIG. 1 about to exit a parallel parking spot between two parked vehicles and the vehicle's predicted path.
Figure 5B:
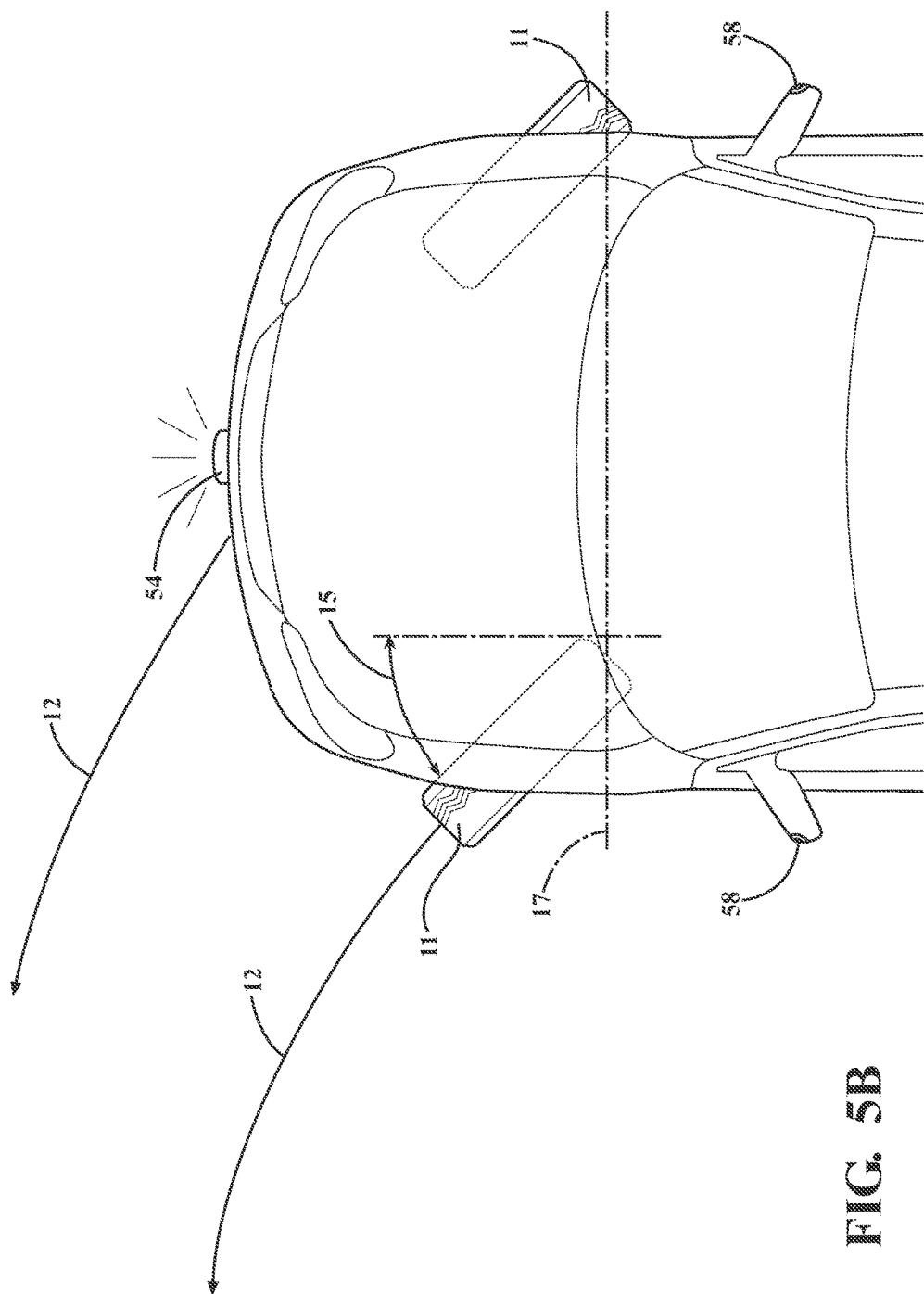

FIGS. 5A and 5B illustrate an example of a third parallel parking egress scenario showing the predicted path of travel 12 of the vehicle 10 with an even greater increase of the wheel 11 angle than in FIGS. 4A and 4B. In the third scenario, it appears that the vehicle 10 will successfully maneuver out of the parallel parking spot in a single forward maneuver.

Figure 6:
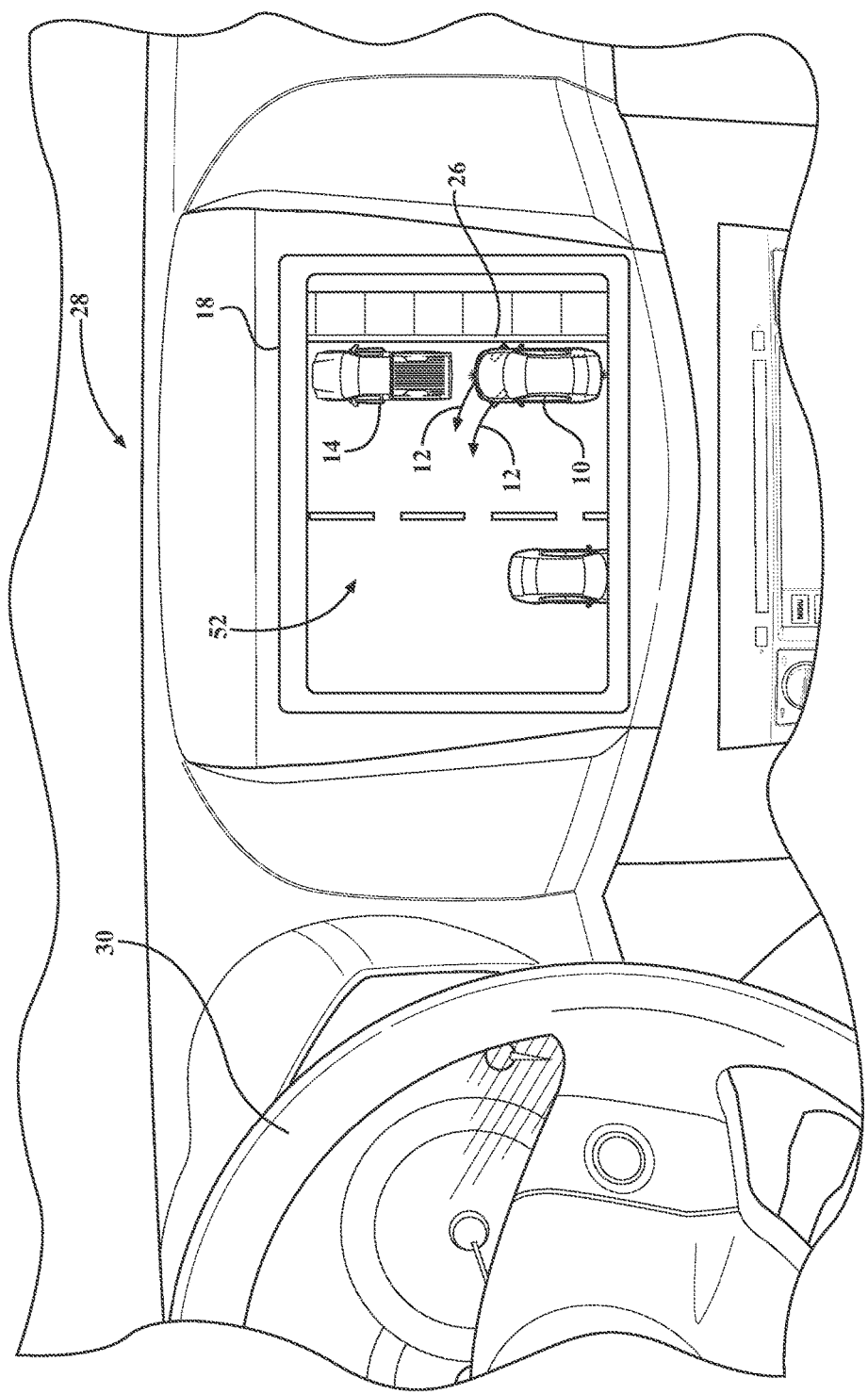
FIG. 6 illustrates an image on a Human Machine Interface (HMI) display of the vehicle of FIG. 1.

FIG. 6 illustrates an example of a dashboard 28 of the vehicle 10. The dashboard 28 includes a steering wheel 30, an HMI 52 with a bezel 19 located around the HMI 52 perimeter. The HMI 52 is shown in this example displaying an overhead, or birds-eye, view of the vehicle 10, and elements of a surrounding environment, including a curb 26, a front vehicle 14, and a displayed path of travel 12. As discussed above, the HMI 52 provides a moving image of the vehicle 10 in relation to the surrounding objects by showing the surrounding objects and the vehicle 10 path of travel 22. For example, the driver will see his or her vehicle 10, the curb 26, and the front vehicle 24, along with vehicle 10 path of travel 22 when he or she is performing the egress maneuver.

HMI and Egressing

When the wheel angle 15 is not sufficient for the vehicle 10 to clear the front vehicle 24 in a single forward maneuver, e.g., as in the first example scenario discussed above, the front vehicle 14, the vehicle 10, and the displayed path of travel 12 appears on the HMI 52 display in a manner to warn the driver of the inadequate clearance, e.g., in red, in flashing text, images, and/or graphics, and/or some other manner. Additionally or alternatively, an aural alarm, such as a chime or a warbling tone, can be sent from the HMI 52 as a warning to the driver of a possible collision. The ECU 60 can also send messages to limit the power sent to the vehicle 10 drivetrain or to apply braking to slow or stop the vehicle 10 when attempting to egress the parking spot without suitable forward clearance. Moreover, if the vehicle 10 has a steering system computer (SSC) (not shown), the SSC can assist the driver and turn the wheels 11 to an angle which allows the vehicle 10 to egress the parking spot, and/or the SSC can autonomously perform an egress maneuver for the vehicle 10 while monitoring the vehicle 10 position if the driver chooses an autonomous park exit mode.

In the second scenario discussed above, it appears that the vehicle 10 path of travel may come dangerously close to and/or collide with the vehicle 14. In this scenario, the displayed path of travel 22 can show up on the display in a manner to warn the driver, e.g., using a predicted path color, such as a yellow color and/or flashing text, graphics, images, etc. Additionally or alternatively, an aural alarm, such as a chime or a warbling tone can be sent from the HMI 52 as a warning to the driver to proceed with caution. Additionally, when calculating the path of travel 12 using either the lateral distance L1 or the regional lateral distance L2, the ECU 60 may limit the power on a transmission's drivetrain or apply braking to 10 to slow or stop the vehicle 10 when the path of travel 12 comes substantially close to the parked vehicle 14, e.g., within a predetermined distance such as five centimeters or less, two centimeters or less, etc., and/or when the risk of collision between the vehicle 10 and the front vehicle 14 exceeds a predetermined threshold, e.g., a 10 percent likelihood. As like above, the vehicle 10 SSC can turn-assist the driver, i.e., turn the wheels 11 to an angle which allows the vehicle 10 to egress the parking spot, or alternatively, the SSC can perform the egress maneuver.

In the third scenario discussed above, the wheel angle 15 is even greater as compared to the first two scenarios, and the vehicle 10 path of travel 22 permits the vehicle 10 to easily egress the parallel parking spot and merge into the roadway 13 in front of the travelling vehicle 16 in a single forward motion. The displayed path of travel 22 can appear on the HMI 52 in a manner so as to not indicate a possible danger situation, e.g., in a green color without an aural alarm.

As discussed above concerning the first two scenarios, the driver of the vehicle 10 can increase the wheel angle 15 to decrease a turning radius of the vehicle 10. With a smaller turning radius the vehicle 10 path of travel 12 may avoid the collision with the vehicle 14 or remove any uncertainty in successfully egressing the parallel parking spot in a single forward maneuver. For example, with reference to FIG. 3, if the HMI 52 is indicating a path of travel 12 that will result in a collision with the front vehicle 14, by turning the steering wheel 30 further to a left direction the wheel angle 15 increases. A new measurement of the wheel angle 15 by the CCSC 62 is sent to the ECU 60 and the vehicle 10 predicted path of travel 12 is updated on the HMI 52 display. The vehicle 10 predicted path of travel 12 on the HMI 52 can change from being red (danger) to yellow (caution). As the steering wheel 30 is turned even further to the left direction, the vehicle 10 predicted path of travel 12 may further change to green or some other HMI 52 indication of no or minimal danger, indicating a non-collision egress is possible. However, if the steering wheel has reached an extreme left limit and the wheel angle 15 is not sufficient for a single forward egress maneuver, the driver of the vehicle 10 may have to deploy additional maneuvering techniques. For example, the driver may have to back up the vehicle 10 while turning the steering wheel 30 in the opposite direction (to the right) to acquire more distance between the vehicle 10 and the vehicle 14.

Figure 7:
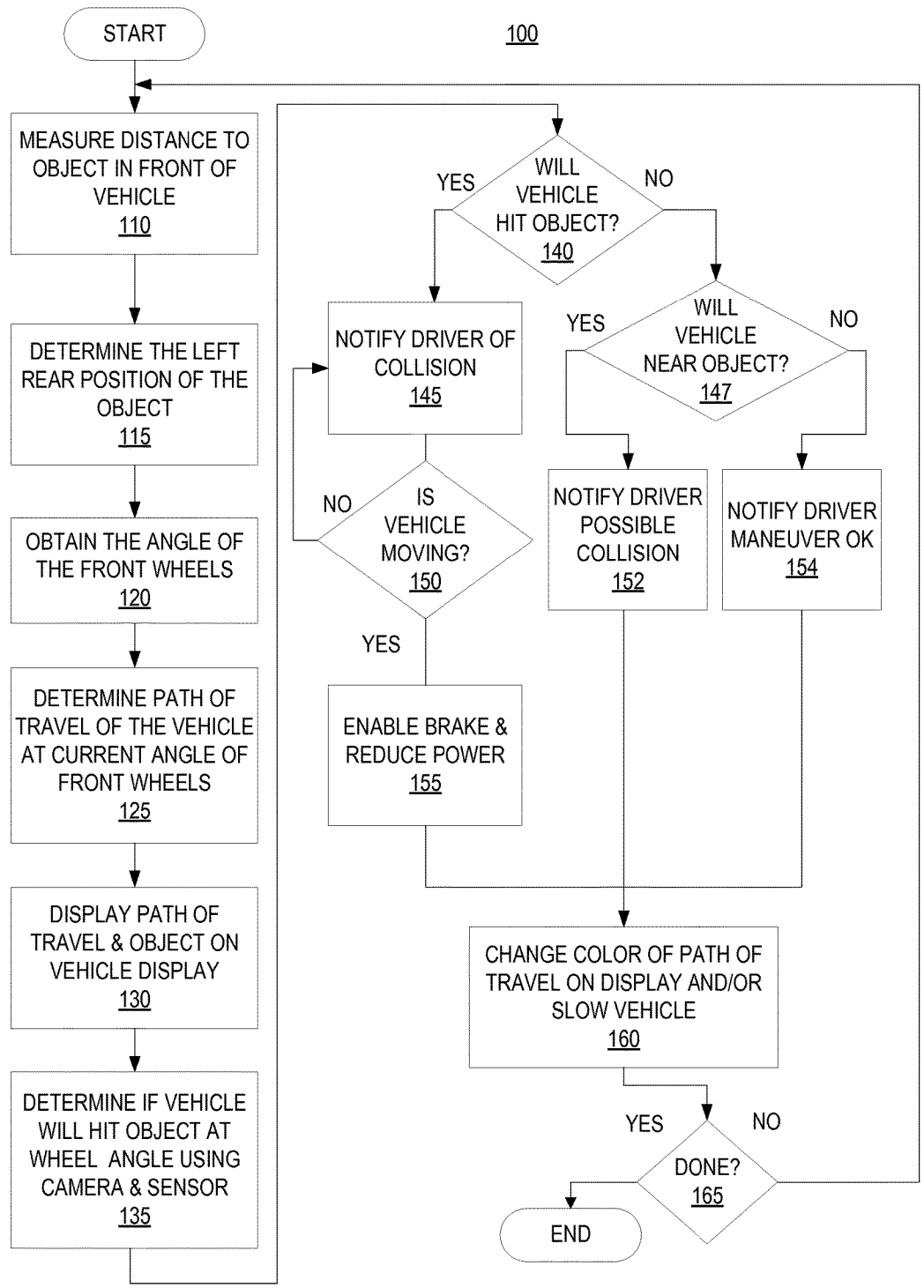
FIG. 7 is an example of a process executed on a CCS computer to determine if a parallel parked vehicle can successfully leave a parking spot with a current steering wheel angle.

FIG. 7 illustrates an example process 100 that may be executed by the processor of the ECU 60, e.g., according to instructions retrieved from the ECU 60 memory, to determine the distance between the vehicle 10 and the vehicle 14, and using the wheel angle 88, determine and display the vehicle 10 predicted path of travel 12 on the HMI 52.

The process 100 begins in a block 110, in which the distance between the vehicle 10 and the vehicle 14 is determined. For example, the distance can be determined by imaging techniques and/or using distance measuring sensor 50, as discussed above.

Next, in a block 115, an external object, such as the vehicle 14 left rear corner 31 position is determined. For example, the left rear corner 31 can be obtained from images from the front grill camera 54 and/or the distance sensor 50. Alternatively, the average lateral distance L2 can be substituted for left rear corner 31 position. For example, if the measuring sensor 50 cannot determine the left rear corner 31 position, the ECU 60 can use the regional lateral distance L2 for the left corner position.

Next, in a block 120, the wheel angle 15 is sent from the CCSC 62 to the ECU 60.

Next, in a block 125, the predicted path of travel 12 is computed based upon the wheel angle 15.

Next, in a block 130, the HMI 52 displays the path of travel 12 of the vehicle 10, the vehicle 10 itself and any surrounding objects. For example, the HMI displays the vehicle 10, the vehicle 10 path of travel 12, the front vehicle 14, and the curb 26.

Next in a block 135, the ECU 60 determines a collision status, i.e., whether the vehicle 10 will strike the front vehicle 14, come substantially close, e.g., within a predetermined distance, to the vehicle 14, or likely not strike the vehicle 14 when egressing the parallel parking spot in a single forward motion. The ECU 60 can take into account the wheel angle 15, the measured distance between the vehicle 10 and the front vehicle 14, and the physical dimensions of the vehicle 10, and the vehicle 14 left rear corner 31 position or the standard outer perimeter distance, when determining a possible collision status.

Next, in a block 140, the process 100 determines if the collision status indicates an imminent collision, and if so, the process 100 continues to in a block 145, else the process 100 continues to in a block 147.

In the block 145, which may follow in the block 140, the ECU 60 sends a notification message to the HMI 52 to notify the driver of the imminent collision. For example, the HMI 52 can emit a warning sound, a chime or a voice alerting the driver. The process continues to in a block 150.

In the 150, the process determines if the vehicle 10 is in motion, the process continues to in a block 155, else the process returns to in the block 145.

In the block 155, the ECU 60 can send instructions to limit the power sent to the vehicle 10 transmission's drivetrain and/or to apply braking to slow or stop the vehicle 10 to prevent the collision with the vehicle 14. In other words, the ECU can limit a maximum-permissible-speed of the vehicle 10 regardless of an accelerator pedal position. The process 100 continues to in the block 160.

In the block 160, which may follow in the blocks 152, 154 or 155, the ECU 60 sends a notification message to the HMI 52 to notify the driver of the imminent collision. For example, the HMI 52 can emit a warning sound, a chime or a voice alerting the driver. If equipped with the steering system computer (SSC), the vehicle 10 can turn the wheels 11 to an angle which allows the vehicle 10 to egress the parking spot, and/or alternatively the SSC can autonomously perform the egress maneuver while the ECU 60 monitors the vehicle 10 position. Following the block 145, the process continues in the block 150.

In the block 147, which may follow in the block 140, the process further decides if the path of travel 12 distance between the vehicle 10 and the front vehicle 14 is going to substantially close or not substantially close, e.g., within a predetermined distance of the vehicle 14. For example, substantially close can be 2.54 centimeters or less, depending on factors such as measurement precision capabilities of distance measuring equipment. The more accurate the distance measuring equipment, in general, the greater the reliability of a potential collision estimate. The determined distance should be greater than a precision with which distance measuring equipment can be used to measure and/or predict distances. If the path of travel 12 is substantially close, the process continues to in a block 152, else the process continues to in a block 154.

In the block 152, which may follow in the block 147, the process notifies the driver of a possible impending collision status. For example, the HMI 52 can emit a warning sound, a chime or a voice alerting the driver. In addition, if the vehicle 10 is equipped with the steering system computer (SSC), the SSC can turn the wheels 11 to an angle which allows the vehicle 10 to successfully egress the parking spot, and/or alternatively the SSC can autonomously perform the egress maneuver while the ECU 60 continuously monitors the vehicle 10 position. Then the process 100 continues in the block 160.

In the block 154, which may follow in the block 147, the process may notify the driver the path of travel 12 will not cause the vehicle 10 to collide with the vehicle 14. Then the process 100 continues to in the block 165.

In the block 160, which may follow in the blocks 152, 154 or 155, the ECU 60 can change or update the manner of displaying the path of travel 12 on the HMI 52, e.g., a one or more colors on the display may be modified to indicate an alert condition, or lack thereof, as described above. For example, the path of travel 12 can change from green to red, indicating a potential danger with the vehicle 10 forward maneuver, the HMI 52 can display a yellow path of travel indicating caution, or a green path of travel indicating it is safe to proceed.

The process 100 continues to in a block 165, in which the process determines if the forward maneuver is complete. If the forward maneuver is complete, the process 100 ends, else the process 100 returns to in the block 110.

At each iteration of the process 100, a distance between the vehicle 10 and the vehicle 12 continually diminishes as the vehicle 10 moves forward. However, the distance is constantly being determined from data from the cameras 54 56 58, and the sensor 50, and is constantly taken into account in the block 110.

Figure 8:
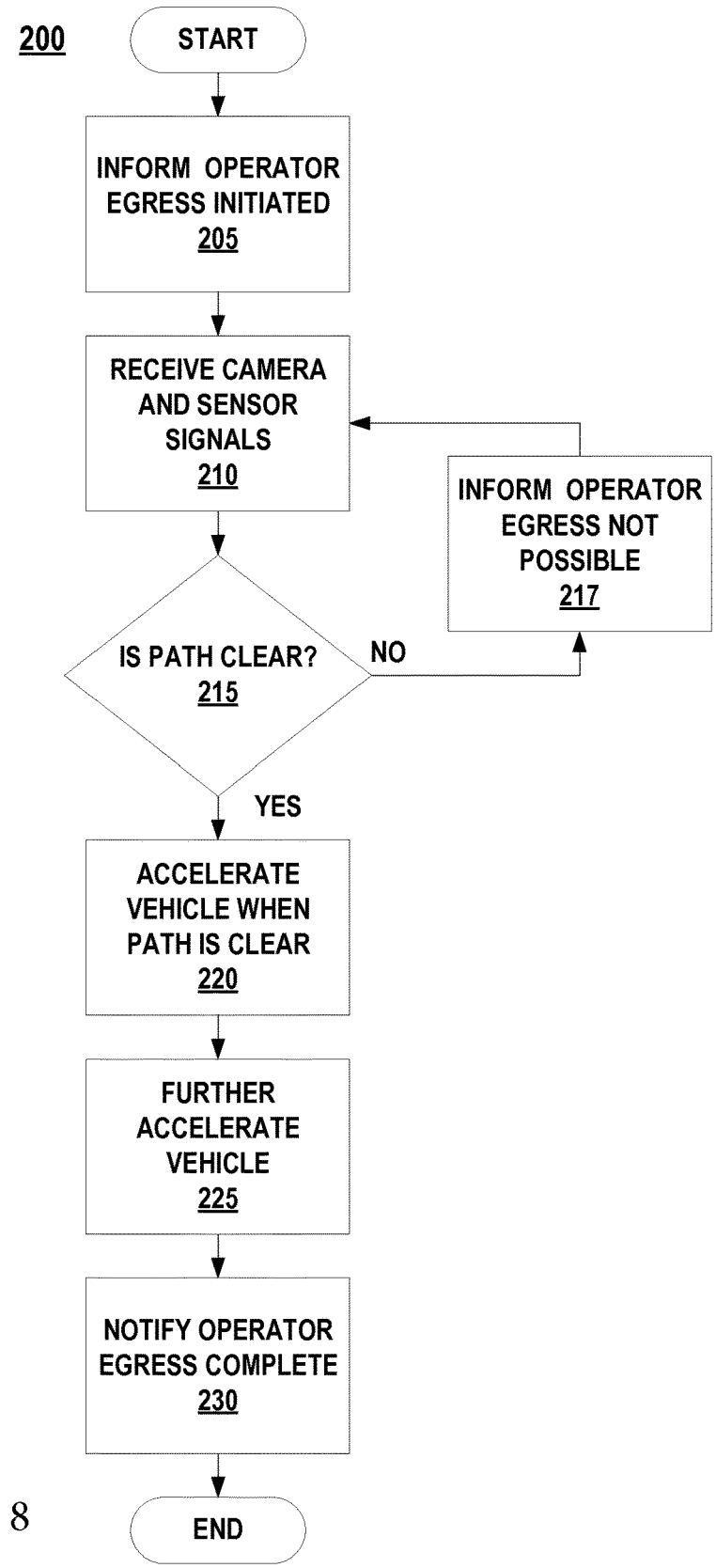
FIG. 8 is an example of a process executed on a CCS computer in which the vehicle automatically exits a parking space.

FIG. 8 illustrates an example process 200 that may be executed by the ECU 60, according to instructions retrieved from the ECU 60 memory, to assist the operator by automatically controlling the vehicle 10 to exit out of the parking space while placing speed limits on the vehicle 10.

The process 200 begins in a block 205, in which the ECU 60 informs to the operator of the vehicle 10 that an egress maneuver is initiated. For example, the ECU 60 can send an aural and visual message to the HMI 52. In addition, the ECU 60 may send a message to the CCSC 62 to shake a steering wheel to further confirm the vehicle 10 is in a park out assist mode of operation.

In a block 210, which may be reached from in the block 205 or in a block 217, the ECU 60 receives signals from distance sensor 50 and cameras 54, 56, 58, such as those described with respect to FIG. 1. In addition, the ECU 60 is in communication with the CCSC 62, which monitors and controls the movement of the vehicle 10.

In the block 215, the ECU 60 determines if the vehicle 10 can successfully egress the parking spot. For example, based on the distance between the vehicle 10 and objects behind, ahead, and to the side of the vehicle 10, the ECU 60 can command the vehicle 10 to move, steer and accelerate out of the parking space when it is clear to do so. The process continues in a block 220, else the vehicle returns to in the block 210.

In the block 217, which may follow in the block 215, the ECU 60 will send a message to the operator of the vehicle 10 that egress is not possible at this time. For example, a tree limb may have fallen in front of the vehicle 10 which requires the operator to remove the tree limb from the path of travel before the egress can be continue.

In a block 220, which may follow in the block 215, the vehicle 10 begins to accelerate away from the parking space and a limit is placed on the maximum permissible speed and/or on the maximum permissible rate of change of speed (acceleration). This limit can alter based on the difference between the vehicle 10 and the detected external objects, such as vehicle 14, which is in front of vehicle 10. While the operator depresses the accelerator pedal, indicating a desired acceleration to propel the vehicle 10 away from the parking space, the ECU 60 will permit a limited acceleration; the limit on the speed and/or acceleration is based on how far away the external objects are.

When the egress is initiated, an intended direction of travel is determined by the ECU 60, and the steering wheel and acceleration of the vehicle 10 can be accordingly controlled. As an object along this path or within a "buffer zone" about the vehicle 10 becomes closer, the speed and/or acceleration of the vehicle 10 is automatically limited accordingly. For example, the vehicle 10 may be allowed to reach 4 kph based on the distance between the vehicle 10 and the vehicle 14 ahead being several meters. This distance may decrease between the two vehicles as the vehicle 10 accelerates away from the parking space during the park out maneuver. As the distance decreases to 1.5 m, the ECU 60 may limit the maximum permissible speed to 1.5 kph. Of course, when the vehicle 10 "clears" the vehicle 14 while moving away from the parking space, the maximum permissible speed may increase again accordingly.

This maximum permissible speed/acceleration may increase and decrease according to a linear relation with respect to the distance between the vehicle 10 and the vehicle 14. Of course, other non-linear relationships may exist. For example, a curved relationship may exist such that the maximum permissible speed/acceleration reduces at a faster rate as the distance decreases.

In a block 225, a gradual increase in maximum permissible speed and/or acceleration is permitted as the vehicle 10 exits the parking space. As the vehicle 10 exits the parking space and the distance from the vehicle 10 to the vehicle 14 increase, the speed of the vehicle 10 may be permitted to gradually increase to reflect the accelerator pedal position. In other words, the difference between an amount of demanded acceleration (based on accelerator pedal position) and an actual commanded acceleration reduces during the gradual permitted acceleration.

A transition between the limited maximum permissible speed and/or acceleration to the removal of such limits may be completed over a tunable distance between the vehicle 10 and the vehicle 14. In other words, the transition from being speed-limited to non-speed-limited can occur as the distance between the vehicle 10 to the vehicle 14 increases towards a certain programmable distance. Alternative to, or in combination with, accomplishing the transition over a tunable distance (e.g., 6 meters), the transition can also occur over some tunable time value (e.g., 3 seconds).

In a block 230, the ECU 60 provides an audible and/or visual instruction to the operator via the HMI 52 to take control of the steering wheel. Such an instruction can also be in response to a clear path existing in front of the vehicle 10 in the traffic lane that the vehicle 10 has turned onto. Once the operator takes control of the steering wheel, as determined by a signal received from a steering wheel torque sensor connected to the CCSC 52, the vehicle 10 will relinquish control of the vehicle 10 to the operator.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices such as those discussed herein generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, C#, Visual Basic, Java Script, Perl, HTML, PHP, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non-volatile media, volatile media, etc. Nonvolatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A method, comprising:
   detecting a distance between a vehicle and an object, and a location of a curb;
   determining, based on the distance between the vehicle and the object and based on the location of the curb, that a path of travel of the vehicle presents a risk of collision between the vehicle and the object; and
   causing by a processor, without considering operator input, a wheel angle to be changed to reduce the risk of collision.

2. The method of claim 1, wherein the distance between the vehicle and the object is determined using at least one or more of a plenoptic lens camera technique, a calibrated camera technique, a laser distance finder, a stereo camera distance measuring technique, and a depth of field-focal length technique.

3. The method of claim 1, wherein the distance between the vehicle and the object is determined using at least one or more of an ultrasound distance measuring device, a LIDAR distance measuring device, a laser distance measuring device or a radar sensor array distance measuring device.

4. The method of claim 1, further comprising, displaying the path of travel on a human machine interface (HMI).

5. The method of claim 1, further comprising, changing a path color based at least in part upon the path of travel and the distance between the vehicle and the object.

6. The method of claim 1, further comprising, providing a warning of the risk of collision based at least in part upon the path of travel and the distance between the vehicle and the object.

7. The method of claim 1, further comprising, limiting a power sent to a vehicle drivetrain based on the distance between the vehicle and the object.

8. The method of claim 7, wherein the limiting includes limiting the power sent to a vehicle drivetrain irrespective of an accelerator pedal position.

9. The method of claim 8, wherein increasing power sent to a vehicle drivetrain is further based on a time elapsing subsequent to the distance exceeding a threshold.

10. A system, comprising an electronic control unit (ECU) that includes a processor and a memory, the memory storing programming executable by the processor to:
    detect a distance between a vehicle and an object, and a location of a curb;
    determine, based on the distance between the vehicle and the object and based on the location of the curb, that a path of travel presents a risk of collision between the vehicle and the object; and
    cause, without considering operator input, a wheel angle to be changed to avoid a collision.

11. The system of claim 10, wherein the ECU is further programmed to communicate with a chassis control system computer (CCSC) to cause the wheel angle to be changed to avoid collision.

12. The system of claim 10, wherein the distance between the vehicle and the object is determined using at least one or more of a plenoptic lens camera technique, a calibrated camera technique, a laser distance finder, a stereo camera distance measuring technique, and a depth of field-focal length technique.

13. The system of claim 10, wherein the distance between the vehicle and the object is determined using at least one or more of an ultrasound distance measuring device, a LIDAR distance measuring device, a laser distance measuring device or a radar sensor array distance measuring device.

14. The system of claim 10, wherein the ECU is further programmed to provide a warning of the risk of collision based at least in part upon the path of travel and the distance between the vehicle and the object.

15. The system of claim 10, wherein a power sent to a vehicle drivetrain of the vehicle is limited based on the distance between the vehicle and the object.

16. The system of claim 15, wherein the power sent to a vehicle drivetrain is irrespective of an accelerator pedal position.

17. The system of claim 10, wherein the ECU is further programmed to display the path of travel on a human machine interface (HMI).

18. The system of claim 17, wherein the ECU changes a predicted path color is based at least in part upon the path of travel and the distance between the vehicle and the object.

19. A vehicle comprising:
a plurality of object detecting sensors configured to detect a location of an external object and a location of a curb; and
an Electronic Control Unit (ECU) programmed to, in response to the location of the external object and the location of the curb, and without considering operator input, limit power sent to a vehicle drivetrain based on a distance between the vehicle and the external object and based on the location of the curb.

20. The vehicle of claim 19, further comprising an accelerator pedal that, when depressed, indicates an amount of demanded acceleration, wherein the ECU is further programmed to limit power sent to the vehicle drivetrain to an amount less than a demanded acceleration based on the distance between the vehicle and the external object.

* * * * *